United States Patent [19]
Walton

[11] 3,943,713
[45] Mar. 16, 1976

[54] CONTROL ARRANGEMENT
[75] Inventor: Erlen B. Walton, Farmington, Mich.
[73] Assignee: Eaton Corporation, Cleveland, Ohio
[22] Filed: Nov. 25, 1974
[21] Appl. No.: 526,774

[52] U.S. Cl. .................... 60/395; 60/403; 60/448; 60/905; 60/406
[51] Int. Cl.² .................... F16H 39/46; F15B 20/00
[58] Field of Search ............ 60/390, 391, 395, 403, 60/406, 448, 905, DIG. 2, 435, 436

[56] References Cited
UNITED STATES PATENTS

| | | | |
|---|---|---|---|
| 2,384,962 | 9/1945 | Pohl | 60/390 |
| 2,571,480 | 10/1951 | Patterson | 60/436 |
| 3,213,763 | 10/1965 | Pearson et al. | 60/448 X |
| 3,685,290 | 8/1972 | Krusche | 60/905 X |

Primary Examiner—Edgar W. Geoghegan
Attorney, Agent, or Firm—Teagno & Toddy

[57] ABSTRACT

A hoist system employing a hydraulic motor, a variable displacement reversible flow hydraulic pump for supplying hydraulic fluid to the hydraulic motor, and an electric motor employed as a prime mover for the pump has a control arrangement effective for sensing various indicia of operation as, for example, rate of speed of lifting of an associated load, failure of the hoist system power train and the lifting of maximum loads. Within the overall control arrangement means are provided for comparing the actual rate of speed of lifting to the desired or requested rate of speed of lifting with the differential thereof being directed back to the associated mechanism for varying the output displacement of said hydraulic pump for thereby modifying such output displacement in order to achieve zero differential output. Means are also provided for automatically braking the hoist drum in order to prevent the load carried thereby from dropping in the event of a failure of the said power train. Means are also provided for varying the maximum speed of the hoist system with variations in load.

11 Claims, 4 Drawing Figures

CONTROL ARRANGEMENT

BACKGROUND OF THE INVENTION

Heretofore, in arrangements employing hydraulic pumps and hydraulic motors for driving hoist drums, various systems and devices were proposed for preventing the accidental release of the load being lifted. However, such prior art systems have been generally complicated and costly to construct and, in many instances, especially where the system which was intended to prevent total accidental loss or release of the load actually comprised a portion of the power transmission or power train, such prior art systems were prone to failure.

Accordingly, the invention as herein disclosed and described is primarily directed to the solution of the above as well as other attendant problems.

SUMMARY OF THE INVENTION

According to the invention, a control arrangement for a power supply system employing a variable displacement hydraulic pump, a prime mover for driving said hydraulic pump, a hydraulic motor driven by said hydraulic pump, and power transmission means driven by said hydraulic motor comprises first means effective for producing a first output signal indicative of the actual speed of said power transmission means, second means effective for producing a second reference signal indicative of a desired speed of said power transmission means, and comparator means effective for comparing said first and second signals, said comparator means being effective and operative to selectively vary said displacement of said variable displacement hydraulic pump in response to and in accordance with the differential of said first and second signals.

Various general and specific objects and advantages of the invention will become apparent when reference is made to the following detailed description considered in conjunction with the accompanying drawings.

Brief Description of the Drawings

In the drawings, wherein for purposes of clarity certain elements and details may be omitted from one or more views.

Detailed Description of the Preferred Embodiments

Figure 1:
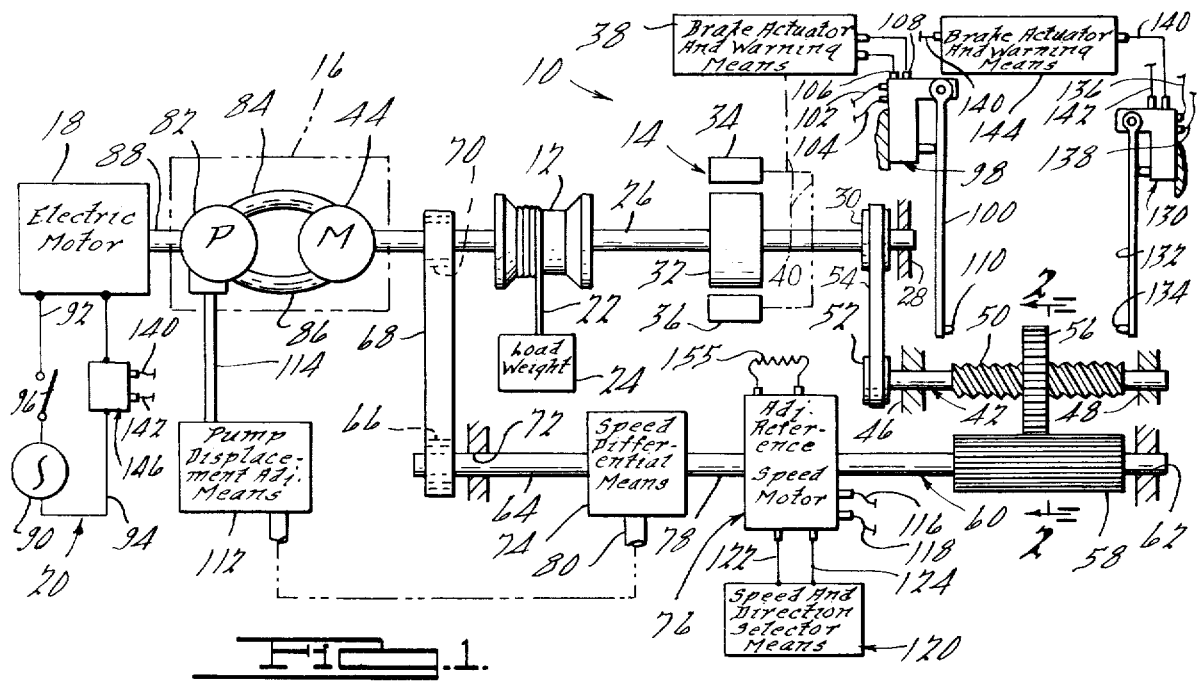
FIG. 1 is a generally simplified illustration, partly in schematic form, of a hoist assembly employing the teachings of the invention; for purposes of reference, the view of FIG. 1 may be considered as being a generally side elevational view.

Referring now in greater detail to the drawings, FIG. 1 illustrates, in somewhat simplified and diagrammatic form, a hoist system 10 comprising a hoist drum 12, a brake assembly 14, a hydraulic pump and motor assembly 16, a cooperating electric motor 18 and related electrical circuitry 20.

The drum 12, operatively connected as to one end of suitable cable means 22 the other of which is suitably adapted for connection to a load 24 to be lifted, is suitably secured, as by keying means, to rotatable shaft means 26 for rotation therewith. Shaft 26 may be journalled in related bearing assemblies as, for example, typically illustrated at 28.

One end of shaft means 26 is in operative engagement with a hydraulic motor 44 of assembly 16 while the other end of shaft means 26 is illustrated as being in operative engagement with a drive, which includes sheave or spur-gear-like drive member 30 which is suitably fixedly secured to shaft means 26 for rotation therewith.

The brake assembly 14 is shown as comprised of a brake drum or wheel 32, suitably fixedly secured to shaft means 26 for rotation therewith, and movable brake shoes 34 and 36 which are, in turn, operatively controlled by associated brake actuator means 38. Preferably, the brake actuator means 38 is of the type, many specific embodiments of which are well known in the art, which, upon loss of electrical power thereto, causes application of the brake shoes 34 and 36 against brake drum 32 as through related motion transmitting means 40.

Second shaft means 42, journalled as at 46 and 48 comprises an axially extending worm or screw threaded portion 50 which is rotatably driven as by means of a sheave or gearlike driven member 52 fixedly secured to shaft means 42 and operatively connected to shaft means 26 as by means of drive member 30 and a continuous motion transmitting belt 54 looped about drive member 30 and driven member 52.

A spur-gear-like member 56 is threadably received on threaded member 50 while, at the same time, being peripherally in meshed engagement with an axially elongated spur gear section 58 fixedly carried by and rotatable with third shaft means 60 which may be journalled at a plurality of places as generally typically depicted at 62.

Fourth shaft means 64 is illustrated as being provided with a suitable driven wheel (which may be what is often referred to as a timing belt gear) 66 fixedly secured thereto for rotation therewith. A continuous motion transmitting belt 68 looped about driven member or gear 66 is also operatively looped about a similar drive wheel or gear 70 fixedly secured to shaft means 26 for rotation therewith. Shaft means 64 may, of course, be journalled at any number of locations as typically illustrated, for example, at 72. The other end of shaft means 64 is operatively connected to suitable speed differential means 74, such as a differential gearing means many specific embodiments of which are known in the art.

A variably adjustable speed electric motor 76 is situated as to be operatively connected to shaft means 60 as well as to additional shaft means 78, the other end of which is operatively connected to the differential gearing means or assembly 74. As will subsequently become more apparent, shafts 64 and 78 respectively comprise first and second speed signal input means leading to the differential assembly 74 which, as generally diagrammatically illustrated as output shaft means 80 which rotates, as is well known in the art, at a speed which is a function of the differential of the first and second speed signal means 64 and 78.

Assembly 16 is illustrated as comprising a hydraulic motor 44, which is bidirectional, and a variable displacement reversible flow pump assembly 82. In the embodiment illustrated, pump assembly 82 comprises a swash-plate type pump (many embodiments of such being well known in the art). The pump 82 and hydraulic motor 44 may be operatively connected to each other as by conduit means 84 and 86 any of which, depending on the mode of operation of pump 82, may serve as the outlet conduit from pump 82 while at other modes of operation the same such conduit would serve as an inlet for the pump 82.

In any event, hydraulic pump assembly 82 is operatively connected, as through a shaft 88, to electric motor 18 which, in the embodiment shown, is A.C. and of a constant speed.

The electrical circuitry 20, very briefly and schematically illustrated, comprises an alternating current source of electrical potential 90 having one terminal connected to conductor means 92 and an other terminal connected to conductor means 94 with both of such conductor means leading to the electric motor 18. As generally illustrated, conductor means 92 may also be comprised of master-like switch means 96 effective for causing, upon closure thereof, energization of motor 18.

An electrical limit switch assembly 98, comprising a downwardly depending actuating arm 100, has a pair of electrical terminals 102 and 104 electrically connected to a suitable source of electrical potential as, for example, source 90 while a second pair of electrical terminals 106 and 108 are electrically connected to the brake actuating means 38. The lower end 110 of arm 100 is placed as in the general path of axial movement of member 56 so that, as will subsequently become more evident, when member 56 abuts against end 110 of lever 100, limit switch 98 will be actuated thereby, in turn, causing the brake applying means 38 to apply brake shoes 34, 36 against brake drum 32 and prevent further rotation thereof as well as the associated power train connected thereto.

As previously indicated, pump assembly 82 is of the swash-plate type. Therefore, although associated pump displacement adjustment means 112 has been depicted as being somewhat physically displaced or removed from the pump assembly 82, such adjustment means 112 may well comprise a portion of the overall pump assembly 82 and, in fact, be an integral part of the otherwise conventional mechanism for adjusting the direction and degree of angular displacement of the pump assembly swash-plate. In any event, the adjustment means 112 is diagrammatically depicted as having operative connection to and with such pump assembly 82 as by suitable motion transmitting means 114.

The adjustable reference speed motor 76 is illustrated as having a pair of terminals 116, 118 electrically connected to a suitable source of electrical potential such as, for example, source 90. Suitable related selector control panel means, or the like, 120 is illustrated as being electrically connected to the motor 76 as by electrical conductors 122 and 124. The control panel means, many of which are well known in the art, provides for the manual selection as, for example, by appropriate levers and/or buttons, of the desired speed and direction of rotation of the output of motor 76.

General Operation of Invention of FIG. 1

Figure 2:
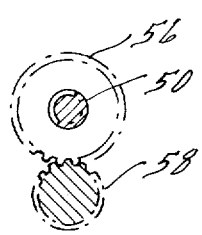
FIG. 2 is a fragmentary cross-sectional view taken generally on the plane of line 2—2 of FIG. 1 and looking in the direction of the arrows.

In describing the general operation of the invention as shown in FIG. 1, the terms of reference "clockwise" and "counter-clockwise" are employed in describing directions of rotation. For clarity, it is pointed out that such terms of reference are to be interpreted as if the person observing such relative movements was generally at the right-hand end of FIG. 1 and looking in the direction of the arrows of the plane of line 2—2 of FIG. 1. FIG. 2 illustrates the rotational orientation.

With switch 96 closed and motor 18 energized, let it be assumed that pump assembly 82 is now supplying hydraulic pressure to hydraulic motor 44 such as to cause clockwise rotation of shaft 26 thereby resulting in hoist drum 12 lifting load 24 via cable 22. During such clockwise rotation shaft means 42 and screw or lead member 50 will also rotate in the clockwise direction because of the drive and driven members 30 and 56 being interconnected by the belt means 54.

Generally, upon initiation of the lifting of a load 24, gear 58 will rotate, in the counter-clockwise direction, at a speed which is related to the speed of lifting demanded by means 120 and 76. The actual speed demanded may well exceed that at which it is believed the load 24 may be safely raised because of the mass of that particular load being lifted. If in fact the demanded or requested speed is of such a magnitude differential gear 56 will move sufficiently to the left to contact abutment portion 110 of limit switch assembly 98 and thereby cause a shutdown of the system. However, in circumstances wherein such magnitudes of speed demands do not occur, the actual lifting speed is correspondingly increased and such increase is reflected in an increased clockwise rotation of shaft 26 and lead gear 50 thereby preventing differential member 56 from so moving to the left and engaging abutment portion 110 of limit switch assembly 98.

As shaft 26 is being rotated in the assumed clockwise direction, drive member 70 and belt 68, through driven member 66, cause shaft means 64 to likewise rotate in a clockwise direction at a velocity which is directly related to the angular velocity of shaft 26. The angular velocity of shaft 64 is employed as a first velocity input signal into the speed differential means 74 and is, in fact, a signal of the actual angular speed or velocity of the power train of the hoist system and hoist drum 12.

The hoist system operator, through the agency of the speed selector means 120, selects a desired speed at which he desires the load 24 to be actually lifted. In so selecting a desired speed, the operator is actually adjustably selecting the output speed of rotation of motor 76 and such output speed or velocity is, as will become totally apparent, then employed as a reference angular velocity against which the actual angular velocity is compared. That is, the shaft 78, rotated by said motor 76 at said reference angular velocity, is operatively connected to the speed differential means 74 and the said reference angular velocity is thereby employed as a second velocity input signal into the speed differential means 74. If the algebraic summation of the first and second velocity input signals is zero (0), the rotational output on motion transmitting means or shaft 80 will also be zero (0).

However, if the first velocity input signal is such as to indicate that the actual angular velocity of shaft 26 is less than that requested as indicated by the second velocity input signal, the speed differential means will, in accordance with the differential of such input signals, create an output on motion transmitting or shaft means 80 which is then transmitted to and through the pump displacement adjustment means 112 to the pump assembly 82 in order to adjust the swash-plate angle to increase the output of pump 82. As the output of pump 82 is thusly increased the speed of rotation of shaft 26 increases as does the angular velocity of shaft 64. This, of course, increases the algebraic value of the first velocity input signal until such time as when the algebraic value thereof is sufficient to exactly offset the second velocity input signal established as a reference value. When that happens, the sensed differential is zero and the movement of output shaft 80 is terminated.

The converse is also true; that is, if the speed of rotation of shaft 26 is more than the desired reference speed as indicated by the second velocity input signal, the resulting differential will cause output shaft 80 to reduce the displacement of pump assembly 82 so as to reduce the speed of rotation of shaft 26 until, again, there is a zero (0) differential as between the first velocity input signal and the second velocity input signal.

In view of the preceeding, it can be seen that there is, in effect, a closed loop system employing feedback signals to correct the angular speed of the drum 12 and shaft 26 as to match a desired velocity value established as a reference by the motor 76. That is, if one considers the input from motor 76 as being a reference value, then it can be seen that the second input from shaft 26 is automatically and continuously compared to the reference value and any difference therebetween is translated into either a positive or negative error signal and that, in view of both the magnitude of such error signal as well as whether it is positive or negative, a correction is made to appropriately change the value or magnitude of the second input signal. As the magnitude of the second input signal is thusly changing and more nearly approaching the reference value, the magnitude of the error signal diminishes until finally the error signal is zero (0).

The invention, although described with reference to the load 24 being lifted, would operate in the same manner when the load is being lowered as by counter-clockwise rotation of shaft means 26 and corresponding changes in rotation of the associated input signal shafts 64 and 78.

The invention as disclosed in FIG. 1 also provides additional safety means for preventing, for example, the free fall of the load 24 should, for example, the hoist power train experience failure. For purposes of description, let it be first assumed that drum 12 and shaft means 26 are being rotated clockwise thereby lifting load 24. Let it be further assumed, for ease of presentation, that the actual speed and reference speed signals as exist on shafts 64 and 78 are matched.

At this time, the electric motor 76 will also be rotatably driving the shaft means 60 and spur gear 58 in the clockwise direction thereby rotating the spur differential member or gear 56 in the counter-clockwise direction. During the condition of operation wherein the actual hoist drum speed is matched to the requested hoist drum speed, the relative angular velocities of gear 58, member 56 and lead member 50 are such that differential member or gear 56 experiences no axial motion relative to either lead member 50 or drive member 58 from that position reached during the matching of actual and reference speeds.

Now let it be assumed that while load 24 is thusly being lifted, the hoist power train experiences a failure as, for example, having the shaft means 26 become sheared at a point between hydraulic motor 44 and drive member 70 for belt 68. As a consequence of such assumed failure, hydraulic motor 44 becomes incapable of even supporting the load 24 and, therefore, load 24 starts to fall and in so doing causes hoist drum 12, as well as shaft means 26, to rotate counter-clockwise. As a result thereof, shaft means 64 and 42 also are rotated counter-clockwise causing, of course, lead member 50 to be accordingly rotated in the counter-clockwise direction. Since at this time of assumed power train failure drive gear 58 on shaft means 60 is still being rotated in the clockwise direction, the reversal in direction of rotation of lead 50 causes differential sensing gear or member 56, while still being rotated in the counter-clockwise direction by drive member 58, to quickly move axially to the left along lead member 50 until member 56 engages end 110 of limit switch lever 100 thereby actuating the limit switch assembly 98. In the preferred embodiment, actuation of the limit switch assembly 98 opens the related electrical circuitry thereby enabling the brake actuating means 38, as by spring loading, to apply the brake shoes 34, 36 against the brake drum 32 and prevent any further rotation of hoist drum 12 and, of course, prevent any further fall of load 24. By a further electrical interconnection of switch 98 and switch 146 the power supply 90 is disconnected from the electric motor 18 at this time.

It should be pointed out that another advantage of the invention comprising the failure sensing portion is that it is not a part of the load carrying train thereby at least eliminating the possibility that the failure sensing portion itself would undergo a failure because of the load being carried or lifted.

FIG. 1 also illustrates that a second limit switch assembly 130 may be provided and similarly comprised of a downwardly depending lever 132 with a lower end 134 similarly placed in the general path of axial travel of member 56. Electrical conductor means 136 and 138 are operatively electrically connected to a suitable source of electrical potential as, for example, source 90. As shown, limit switch means may be electrically connected as by conductor means 140 and 142 to related warning means 144 (which may be visual and/or auditory and which may also be operated by previously described switch 98) and brake actuation means 38 as well as electrical switching means 146 situated in circuit and comprising a portion of conductor means 94. If for some reason the speed at which the hoist drum is rotated is, for example, too great or there is some failure in the reference motor 76 or the associated circuitry and as a consequence thereof the indicator or differential member moves axially sufficiently to the right to engage end 134 of limit switch lever 132, limit switch assembly 130 would then be effective for causing switch assembly 146 to open circuit means 20 and for causing brake actuation means 38 to energize brake assembly 14. Since the brake actuator means 38 is effective to maintain brake shoes 34 and 36 out of engagement with brake drum 32 during only such times as electrical energy is supplied thereto, the opening of circuit means 20 could also function to terminate the supply of electrical energy to brake actuating means 38 resulting in the application of brake means or shoes 34 and 36.

Figure 3:
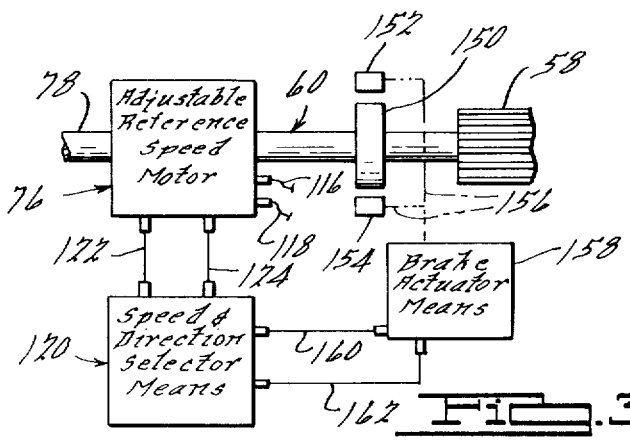
FIG. 3 is a view illustrating, fragmentarily, a portion of the invention shown in FIG. 1 but in modified form.

FIG. 3 is a view of a fragmentary portion of the invention shown in FIG. 1 with a modification thereof. Elements in FIG. 3 which are like or similar to those of FIG. 1 are identified with like reference numbers.

The invention as disclosed in FIG. 3 contemplates the provision of additional suitable braking means in order to hold shaft means 60 and spur gear 58 stationary when zero speed is demanded. Such a device is necessary due to the presence of unbalanced moments on the swash plate of the pump 82 which are continuously transmitted to the speed differential means 78. In an alternative embodiment this ability to maintain zero speed on shaft 60 may be accomplished through use of a suitable resistance 155 across the motor 76 providing a minimum resistance torque. The braking means may be comprised of a suitable brake drum 150 fixedly secured to shaft means 60 and cooperating brake shoes 152, 154 which, through suitable motion transmitting means 156, are operatively connected to related brake actuating means 158.

In the preferred embodiment, the brake actuating means 158, which may be electrically interconnected to the selector means 120 as by conductors 160 and 162, is of the type which applies the brake shoes 152 and 154 by means of preloaded springs and which releases the brake shoes only when electrical power is applied thereto.

Figure 4:
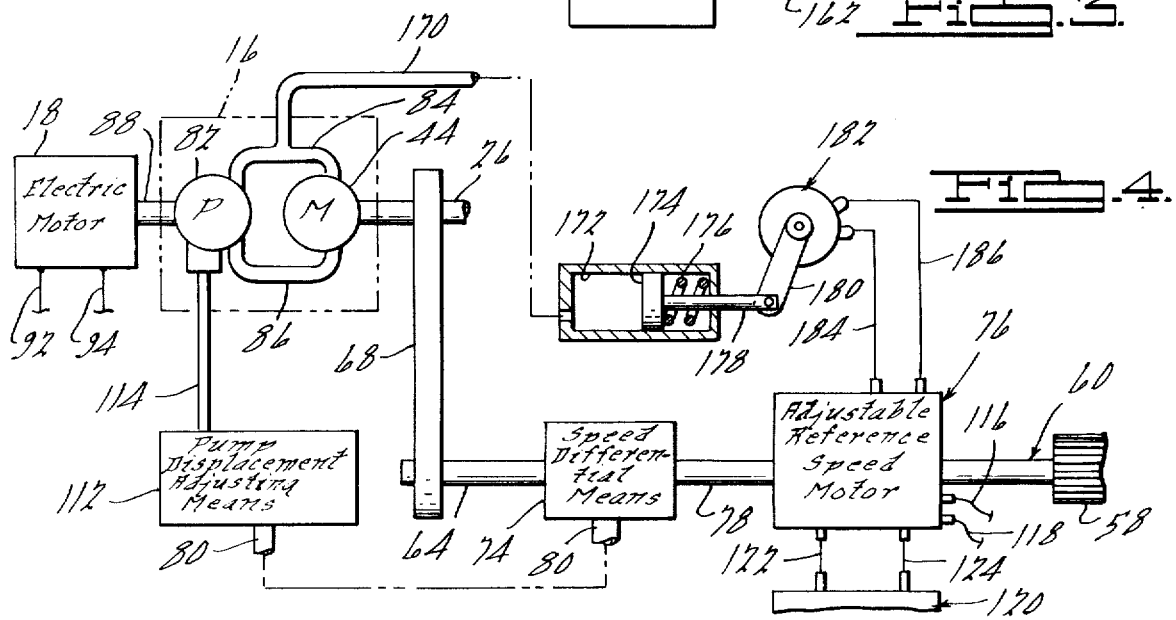
FIG. 4 is a view also illustrating, fragmentarily, a portion of the invention shown in FIG. 1 but in another modified form.

FIG. 4 is a view also illustrating only a fragmentary portion of the invention shown in FIG. 1 with a further modification thereof. In FIG. 4, all elements which are like or similar to those of FIG. 1 are identified with like reference numbers.

The invention as disclosed in FIG. 4 contemplates the employment of means for limiting the magnitude of the requested speed or velocity of lifting in respect to the weight of the load 24 being lifted. Since the output pressure of pump 82 will be a function of the weight of the load 24 being lifted, suitable conduit means 170, having one end in communication with a source of such pump pressure and an other end in communication with a cylinder 172 containing a piston 174 biased by spring means 176, is provided. Piston 174, in turn, is operatively connected as through suitable linkage means 178 and 180 to a potentiometer 182 which, as via conductors 184 and 186, is electrically connected to motor 76. As the weight of the load 24 increases, such increase is reflected by an increase in the pressure delivered by pump 82 and applied to cylinder 172. Piston 174 responds to the increase in pressure by moving further against the resilient resistance of spring means 176 thereby accordingly varying the effective resistance of the potentiometer and correspondingly reducing the maximum speed of the reference motor 76.

The provision of such automatic power limiting means prevents such possibilities as, for example, having the combination of load weight and speed of lifting result in excessive strain on any of the involved components or power train as well as assuring that motor 18 will not enter into a stall region of its operating characteristics.

Although only a select number of preferred embodiments and modifications of the invention have been disclosed and described, it is apparent that other embodiments and modifications of the invention are possible within the scope of the appended claims.

I claim:

1. A control arrangement for a power supply system employing variable displacement hydraulic pump means, a prime mover for driving said hydraulic pump means, hydraulic motor means driven by said hydraulic pump means, and power transmission means driven by said hydraulic motor means, the control arrangement comprising:

first shaft means rotatable at a first angular velocity directly related to the speed at which said power transmission means is driven by said hydraulic motor means;

second shaft means rotatable at a second angular velocity directly related to a desired speed at which said power transmission means is to be driven by said hydraulic motor means;

differential gearing means for comparing said first and second angular velocities wherein said first shaft means is operatively connected to said differential gearing means to provide a first rotatable input into said differential gearing means and wherein said second shaft means is operatively connected to said differential gearing means to provide a second rotatable input into said differential gearing means, and wherein said differential gearing means further comprises at least one output means effective for producing an output signal thereupon which is the algebraic summation of said first and second rotatable inputs; and means effective for varying the displacement of said variable displacement pump means in accordance with said output signal.

2. A control arrangement according to claim 1 wherein said second means further comprises electric motor means operatively connected to said second rotatable shaft means, and wherein said electric motor means is selectively adjustable to provide said second angular velocity to said second rotatable shaft means.

3. A control arrangement according to claim 1 wherein said pumping means includes a swash-plate, and wherein said means effective for varying the displacement of said pump means comprises motion transmitting means operatively connected to said output means of said differential gearing means and said swash-plate.

4. A control arrangement for a power supply system employing variable displacement hydraulic pump means, a prime mover for driving said hydraulic pump means, hydraulic motor means driven by said hydraulic pump means, and power transmission means driven by said hydraulic motor means, the control arrangement comprising:

first means effective for producing a first output signal indicative of the actual speed of said power transmission means;

second means effective for producing a second reference signal indicative of a desired speed of said power transmission means;

comparator means effective for comparing the magnitudes of said first and second signals, said comparator means being effective and operative to selectively vary said displacement of said variable displacement hydraulic pump in response to and in accordance with the differential in said magnitudes of said first and second signals; and means for sensing the output pressure of said pump means and operative to vary the maximum obtainable magnitude of the displacement of said pump means as a function of said output pressure.

5. A control arrangement for a power supply system employing variable displacement hydraulic pump means, a prime mover for driving said hydraulic pump means, hydraulic motor means driven by said hydraulic pump means, and power transmission means driven by said hydraulic motor means, the control arrangement comprising:

first means effective for producing a first, output signal indicative of the actual speed of said power transmission means;

second means effective for producing a second, reference signal indicative of a desired speed of said power transmission means;

braking means effective to, at times, brake further motion of said power transmission means, and differential motion sensing means, said sensing means being effective to sense a sustained speed or error signal, said sustained speed or error signal comprising a certain magnitude of phase shift of said first and second signals in said power transmission means and in accordance therewith cause application of said braking means to brake further motion of said power transmission means.

6. A control arrangement according to claim 2 and further comprising:

means for preventing rotation of said second rotatable shaft means when said electric motor means is selectively adjusted to demand zero angular velocity.

7. A control arrangement according to claim 5 wherein said power transmission means comprises first rotatable shaft means, a rotatable hoist drum including cable means for lifting an associated load, a brake drum, said first shaft means, said hoist drum and said brake drum being operatively interconnected for rotation in unison with each other, a rotatable axially extending lead member rotatably driven by said first shaft means, wherein said comparator means comprises differential gearing means having at least one rotatable output shaft, wherein said first means comprises second shaft means rotatably driven by said first shaft means, said second shaft means being operatively connected to said differential gearing means for applying thereto said first output signal indicative of said actual speed, wherein said second means comprises third rotatable shaft means and operatively connected adjustable speed electric motor means, said third rotatable shaft means being operatively connected to said differential gearing means for applying thereto said second output signal indicative of said desired speed, wherein said pump means comprises an adjustable swash-plate for varying the displacement of said pump means, wherein said at least one rotatable output shaft is effective for rotating at a velocity directly related to the algebraic summation of said first and second output signals, wherein said at least one rotatable output shaft is operatively connected to said swashplate and effective to adjust said swash-plate and the displacement of said pump means in accordance with said algebraic summation, and further comprising rotatable axially extending lead-screw-like means directly rotated by said first shaft means, a differentiating member threadably engaged and carried by said lead-screw-like means, axially extending rotatable gear means operatively connected to said adjustable speed electric motor means as to be rotatably driven thereby, wherein said differentiating member is in meshed engagement with said rotatable gear means as to be capable of being driven thereby rotatably about said lead-screw-like means, said differentiating member being effective to move axially along said lead-screw-like means whenever the difference in speed of rotation of said axially extending rotatable gear means and said lead-screw-like means exceeds a predetermined value, said differentiating member being effective upon sufficient axial movement along said leadscrew-like means to cause application of braking means to said brake drum.

8. A hoist mechanism comprising a prime mover, a variable displacement pump driven by said prime mover, a fluid motor receiving the fluid output of said pump, a hoist drum driven by said motor, first means sensing the output speed of said motor and operative to generate a speed signal corresponding to said output speed of said motor, second means supplying a control speed signal, means comparing said speed signals from said first and second means and operative to selectively vary the displacement of said pump in response to sensed differentials in the said compared signals for controlling the speed of said motor, and means for sensing the pump output pressure and operative to vary the maximum obtainable displacement of said pump as a function of said output pressure.

9. A control arrangement for a power supply system employing variable displacement hydraulic pump means, a prime mover for driving said hydraulic pump means, hydraulic motor means driven by said hydraulic pump means, and rotatable power transmission means driven by said hydraulic motor means, said control arrangement comprising first means effective for indicating the actual speed and direction of rotation of said rotatable power transmission means, second means effective for indicating a desired speed anad direction of rotation of said rotatable power transmission means, and means effective for sensing the occurrence of a reversal in the direction of rotation of said rotatable power transmission means without a corresponding change in said desired direction of rotation or of a sustained difference between said actual speed and said desired speed said difference comprising a certain magnitude of phase shift between the output of said first indicating means and said second indicating means and operative upon such occurrence for applying a braking force to said power transmission means to thereby prevent further rotation of said power transmission means.

10. A control arrangement according to claim 9 wherein said first means comprises axially extending lead-screw means, wherein said second means comprises gear means rotatably driven at a variably selected angular speed, and wherein said means effective for sensing the occurrence of a reversal or sustained difference in speeds comprises a gear member in meshed engagement with said gear means and threadably engaged with said lead-screw means as to be both threadably rotatable about said lead-screw means and axially movable with respect to said lead-screw means.

11. A hoist mechanism comprising a prime mover, a variable displacement pump driven by said prime mover, a fluid motor receiving the fluid output of said pump, a hoist drum adapted to be rotated by said motor, braking means operatively connected to said drum and operative upon actuation to prevent rotation of said drum, first means effective for supplying a first signal indicative of the actual speed and direction of rotation of said drum, second means effective for supplying a second signal indicative of a desired control speed and desired direction of rotation of said drum, and means effective for comparing said first signal and said second signal and being operative upon the occurrence of a reversal in the said direction of actual rotation of said drum without a corresponding change in said desired direction of rotation or upon the occurrence of a sustained difference between said actual speed and said desired speed said sustained difference comprising a certain magnitude of phase shift between the outputs of said first and second means to effect actuation of said braking means.

* * * * *